May 11, 1937.  J. D. KEITH  2,079,861
WIGWAG SIGNAL MEANS
Filed June 10, 1935  3 Sheets-Sheet 1
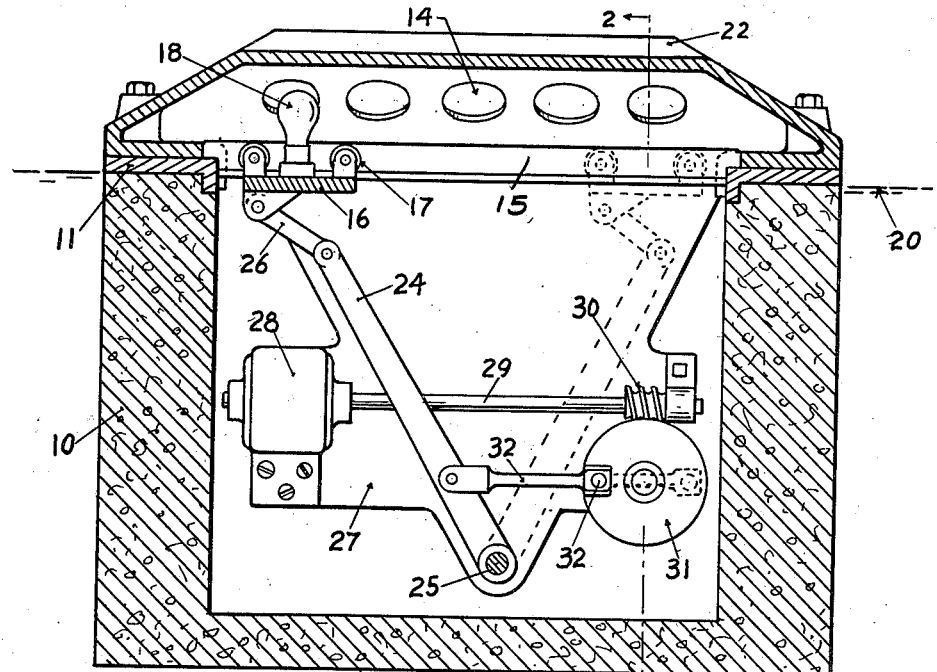
Fig. 1.
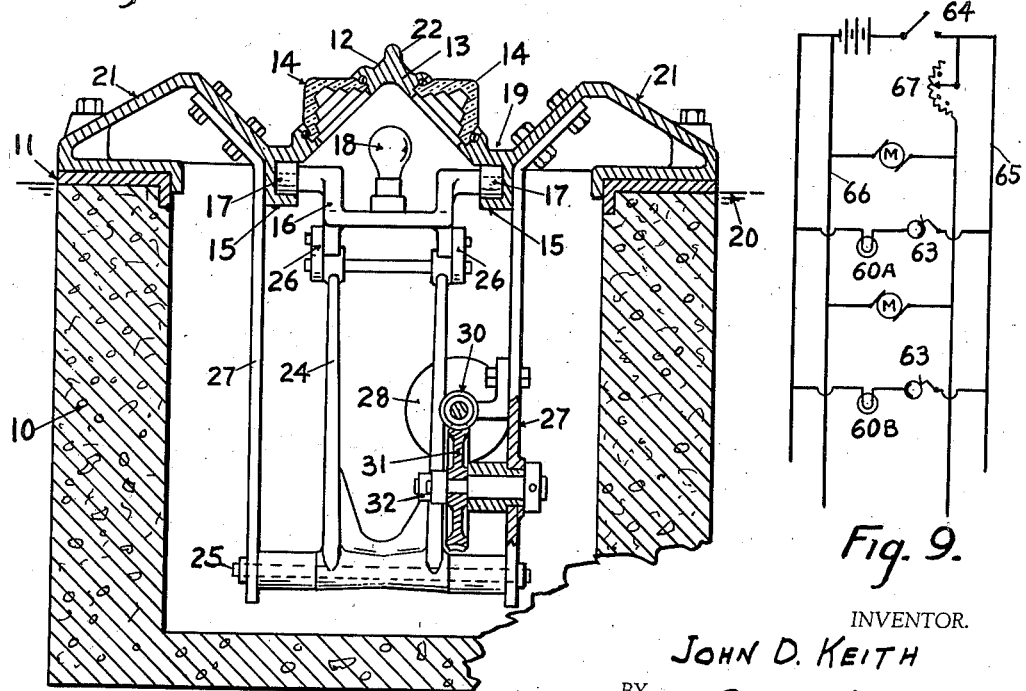
Fig. 2.
Fig. 9.
INVENTOR.
JOHN D. KEITH
BY
ATTORNEY.

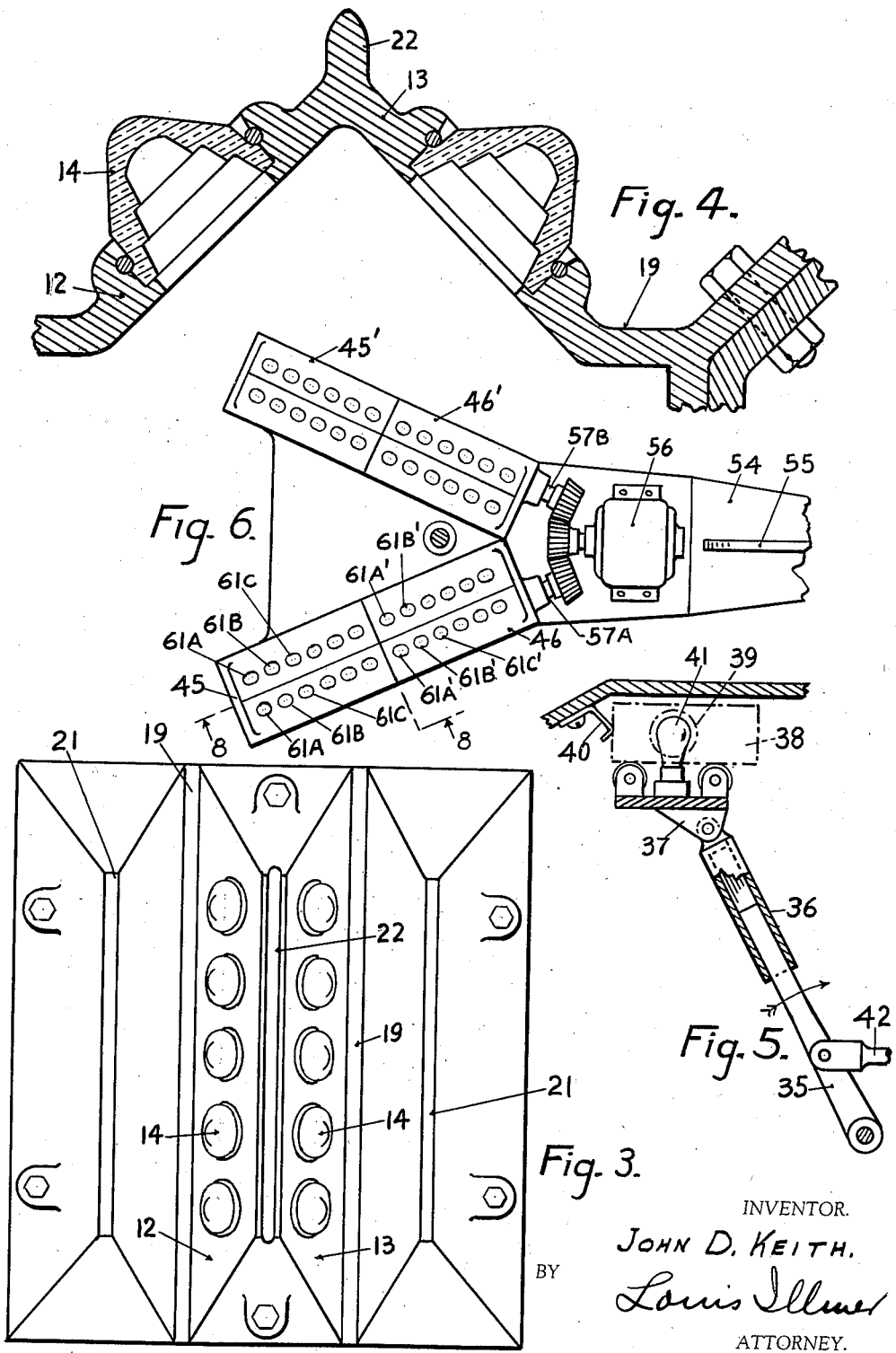

May 11, 1937.  J. D. KEITH  2,079,861
WIGWAG SIGNAL MEANS
Filed June 10, 1935  3 Sheets-Sheet 3

INVENTOR.
JOHN D. KEITH.
BY
Louis Illmer
ATTORNEY.

Patented May 11, 1937

2,079,861

UNITED STATES PATENT OFFICE 2,079,861

WIGWAG SIGNAL MEANS

John D. Keith, Gettysburg, Pa., assignor to Seco Manufacturing Company, a corporation of Pennsylvania Application June 10, 1935, Serial No. 25,781

9 Claims. (Cl. 177—329)

This invention relates to the art of display signals, and more particularly pertains to a flash light signal of the wigwag type comprising a row of closely spaced lenses that may be successively flashed by a single bulb to send forth a distinctive light effect. In the present structure, numerous beehive lenses of relatively large size are preferably arranged in rectilinear, abreast relationship with suitable guideways or tracks disposed in close proximity to such lenses, and which tracks mount a lightable bulb carriage that is power actuated to impart a regular oscillatory movement thereto.

My signal devices are applicable to visible railway crossing signals and to portable warning signals of the flare type, but such improvements have herein been more especially designed for aviation fields to assist a pilot during night flying, to locate a suitable runway from the air upon which to safely make a landing. As applied to the latter purposes, a sunken signal is provided with complementary rows of upturned lenses that are preferably incorporated in a demountable housing or head adapted to cover a pit. The corresponding pairs of such lenses are axially inclined to each other and the entire lens course may be served by a single lighted bulb. The required carriage actuating mechanism may be attached to such head and arranged to be bodily removed therewith in breechlike fashion. Means are also provided whereby the pit mouth is kept water tight and the lenses may readily be swept clean of snow accumulation.

A series of such wigwag units may be placed in tandem alignment and operatively interconnected to function in unison so as to provide for a built-up rectilinear lens course of any required length. This same underlying principle may with advantage be incorporated into an enlarged vane actuated arrow or pointer designed to show the direction of wind blow. All component wigwag lenses may herein be flashed in a single travel direction toward said vane and blinded or extinguished during the return stroke of the several lamp bulbs. In addition, means are provided to automatically regulate the rate of flash travel in conformity with prevailing wind velocity. Such a marker or direction signal is readily discernible from the air and may be utilized not only at air ports but also along airways to guide aviators when the pointer is fixedly mounted upon the top of a high building or other elevation. Although my flash appurtenances are particularly adapted to use after sundown, its characteristic light display can also be readily distinguished from othed signals during daylight hours. Certain other arrangements in which my wigwag units may be utilized for air port purposes, have been more specifically defined in my companion application Serial Number 27,401 as filed June 19, 1935.

My object is to provide for a substantial and reliable motor driven unit of the indicated character. Embodied herein are other design features which facilitate economical fabrication of such wigwag signals on a productive scale, all of which structural aspects will hereinafter be described in detail.

Reference is had to the accompanying three sheets of drawings which are illustrative of preferred embodiments of my invention, and in which drawings:

Fig. 1 represents an elevational cross-section of a sunken pit equipped with my wigwag signal devices, while Fig. 2 is a similar view taken along line 2—2 thereof.

Fig. 3 shows a top view of the pit head, and Fig. 4 details a fragmental arrangement for mounting a series of duplex lenses therein.

Fig. 5 illustrates a modified drive arrangement for my bulb actuating rocker arm.

Figure 8:
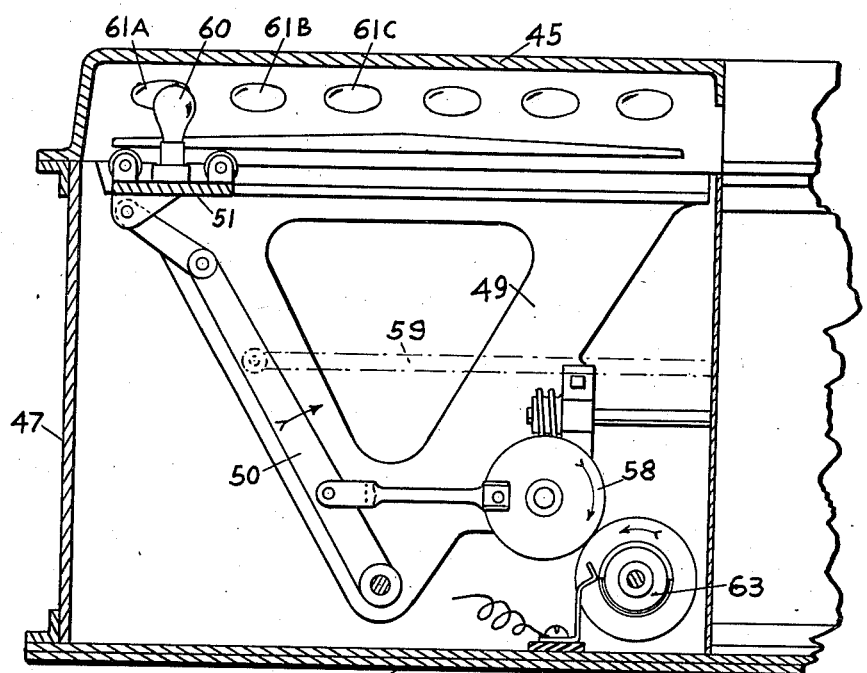
Figure 7:
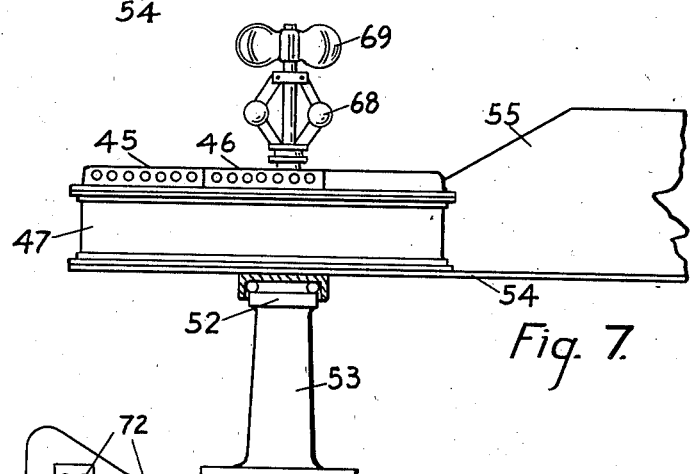

Figs. 6 and 7 respectively depict a plan and an elevational side view of a vane actuated pointer assembly, while Fig. 8 shows a partial sectional view taken along line 8—8 of Fig. 6.

Figure 10:
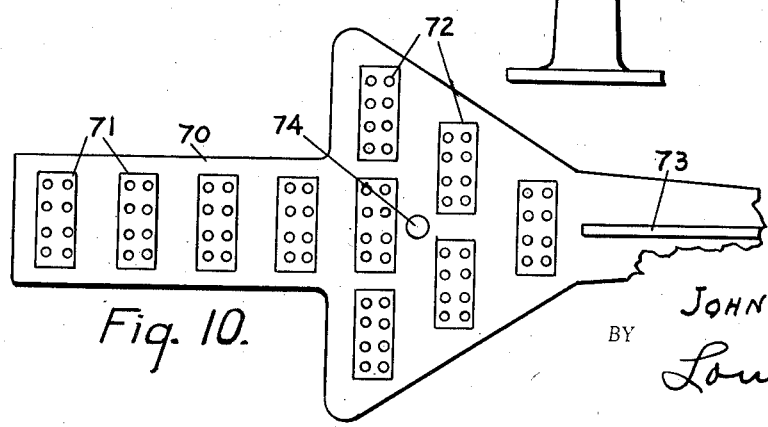

Fig. 9 is a wiring diagram pertaining to the Fig. 6 disclosure, and Fig. 10 shows an alternative pointer arrangement.

Referring first to the sunken pit type of wigwag signal detailed in Figs. 1 to 4, this may comprise a concrete pit 10 of which the open mouth region may be trimmed by a hollow rectangular sole plate 11. Superimposed and bolted thereon, is a relatively flat, metallic cover wall or head piece of which the upturned surface is shaped to form alternate furrows and ridges in the inherently stiffened manner cross-sectionally shown in Fig. 2.

Each of the oppositely sloping side wall components 12 and 13 of such central longitudinal ridge, may be apertured and respectively provided with a course of closely spaced, colored prismatic lenses or other transparencies such as 14, preferably of the beehive type which may be inset as detailed in Fig. 4. Each of these duplex lens courses is formed in rectilinear row formation or abreast alignment (see Fig. 3). The interior dished surface of each lens may be given a stepped profile to include several concentric ledge elements progressively disposed at increasing distances away from the focal point of a cooperating flash lamp in accordance with the Signor Patent #2,002,331 of May 21, 1935, to bring about a simulated whirling light effect. Being free from glaring rays, such flash light is unlikely to blind the pilot even should an intense display be resorted to.

Depending from the bottom region of the respective furrow forming wall portions of my head, are a pair of reversely disposed guideways or tracks such as 15. A lamp conveyor or carriage 16 is suspended therebetween to freely run upon the rollers 17. An electric flash bulb 18 may be mounted centrally upon said carriage with its filament arranged to fall in substantial axial alignment with both lenses contiguous thereto in the manner represented in Fig. 2. The light rays are sent forth upwardly in quadrature through the registering lenses so as to be clearly visible from above when used as a sunken air port signal.

As further indicated in Fig. 3, it is preferred to extend the furrow such as 19 throughout the length of the head piece in order to prevent ray obstruction and to provide a convenient outlet for sweeping the exposed lenses free from any accumulated snow drift. To this end, the bottom of the respective parallel furrows are located somewhat higher than the normal ground level designated as 20. Complementary guard ridges such as 21 respectively lie alongside the lens ridge and serve as a protection for the latter in the event wheels of a landing gear should inadvertently run over the top of the pit head. The upstanding reenforcing rib 22 is intended to uphold such wheel loading away from the lenses. Said rib represents an immaterial detail that may be eliminated.

It is emphasized that my guide track 15 is parallelly disposed with respect to the rectilinear lens ridge 12—13. Heretofore, it has been customary to arrange the lens course in an arcuate path and to sweep the same with a lamp that is swung from a rocker arm. To attain the present result in a conventional manner would require a rocker arm of undue length and a corresponding pit depth.

When operative, the lamp bulb 18 normally reciprocates lengthwise of said guideways at a comparatively slow rate into successive flash registration with both rows of the axially inclined lenses. As herein practiced, a double rocker arm 24 may be mounted to swing through a relatively wide angle around the fulcrum shaft 25. The free ends of such rocker may be pivotally attached to the carriage by means of drag links such as 26. The fulcrum shaft is preferably mounted between a pair of depending framework straps such as 27 of which the respective upper frame ends may be attached to the internal face of the guard ridges 21, as shown in Fig. 2. It will be apparent that the use of but one such strap element 27 may be made to serve a like purpose.

Means for regularly actuating the rocker arm reside in the electric motor 28 which may also be mounted upon one such framework member. Said motor drives the propeller shaft 29 having a worm 30 at the remote end thereof, and which worm may in turn, engage the reduction gear 31. Such gear is provided with a crank pin 32 that is rotatably mounted about a centralized shaft pivot. A connecting rod 33 may be linked to oscillate the rocker together with its lamp carriage. The unitary mounting of this drive mechanism is such that it may as a whole, be operatively removed from the pit in a unit with the pit cover or head piece.

While no special wiring fixtures have been disclosed, it will be obvious that the motor and lamp are to be simultaneously energized and electrically controlled by any suitable means. When the motor is set into operation, the rocker arm will be shifted back and forth from its full-lined into its dotted Fig. 1 position, which in turn drags its linked lamp carriage along the rectilinear track and thereby progressively flashes the course of lenses.

Fig. 5 shows a modified rocker arm 35 in that its swinging end is provided with a telescoped joint or slidable sleeve 36 of which one end is directly pivoted to the carriage lug 37 as a substitute for the drag link 26.

The carriage may also be equipped with a longitudinally slidable blinder tube 38 of the shuttle shutter type having a peep aperture 39 in the respective sides thereof as indicated in dotted outline. When said aligned apertures are shifted after striking the resilient abutment 40, then the light from the bulb 41 will flash the respective lenses, assuming the rocker to be driven clockwise through the connecting rod 42. Upon reaching the opposite dead center of travel, the path of said blinder tube is intended to strike a similar opposed abutment (not shown) which shifts its aperture 39 to blind the oscillatory light upon the return stroke. The purpose of such one way flash effect will presently appear.

In Figs. 6 to 8, there is disclosed an exemplification in which the previously described wigwag structure may be utilized in built up multiple units. When applying my improvements to a vane actuated, direction indicator or wind pointer for air port service or the like, it is desirable to work with an exceptionally long lens course affording a corresponding rectilinear arrow path for one or more flash bulbs. To this end, several of the Fig. 1 units may be adjoined endwise in tandem relationship in the fashion represented in Fig. 6. For wind indicating purposes, two divergent lines of such duplex lens courses are shown. The respective lenses may herein be flashed in a one-way direction headed toward the converging extremity of such courses and which apex portrays the general direction in which the wind is blowing.

In the present embodiment, twin sets of such wigwag head units (namely 45 and 46; or 45′ and 46′), are comprised in the respective V-shaped lens courses, it being obvious that the same underlying principle may be extended to meet requirements. As detailed in Figs. 7 and 8, the concrete pit of Fig. 1 may here be replaced by a sheet metal tanklike casing base 47 of which the upturned mouth region is flanged for the reception of several abutting head pieces such as 45. Each such self-contained head piece may comprise the unitary framework 49 and rocker arm 50 together with a carriage 51 that is slidably mounted in rectilinear rails. Said base is pivotally supported in a turntable fashion about the ball bearing trunnion 52 as carried in elevated position upon a suitable stanchion or mast 53. A horizontal platform plate 54 has a radially disposed tail vane 55 erected thereon which automatically heads leeward and continuously points the apex of my V lens course in the direction of wind blow.

The twin tandem wigwag units shown in Fig. 6 may be actuated by a common drive motor 56 through an intermediate pinion that rotates the complementary propeller shafts 57A and 57B in opposite directions. The respective shafts may extend longitudinally through their aligned casing bases and be equipped with several worm gears such as 58 which respectively rock their arms 50 in unison. As shown in Fig. 7, the course center line of all such flash lenses may be made to lie in a common plane to send forth an effective light display, directed skyward. Instead of resorting to an independent worm gear drive for each wigwag unit, the respective arms thereof may also be interconnected by rocker link or the like tie means such as 59 indicated by dotted outline in Fig. 8. By its use, the interconnected lamp carriages may likewise be made to serve lens courses that lie in different planes. The positive drive interconnection between my several carriages as used in either Fig. 6 or Fig. 8, allows a series of lens courses to be flashed in a fixed concordant relationship.

When operative, the corresponding lighted bulbs such as 60 of each unit will simultaneously sweep their respective flash lenses such as 61A, 61B, etc. in a common direction. Assuming the rocker arm 50 to be rotating clockwise in the direction of the Fig. 8 arrow, then as seen in plan (Fig. 6) the lenses 61A and 61A' of each course will initially be flashed in a maintained spaced relationship corresponding to the carriage travel length. As the respective arms simultaneously move toward the motor 56, their lighted bulbs will successively be carried into registry with the remaining lenses of each unit and hence travel toward the apex of the converging lens courses. This one-way light display will visibly record the blow direction of the wind, although the weather vane 55 itself may not be clearly seen by the pilot when coming into an airport at high elevation or in foggy weather It has been experimentally verified that such characteristic flash light signals may in the dark be observed and picked up from afar even under adverse weather conditions.

If desired, the Fig. 6 pointer assembly may be flashed in both directions of carriage travel, but a more appropriate pointer display is obtained when the respective electric lamps are simultaneously blinded, extinguished or otherwise suppressed during the return stroke of the several bulb carriages. Such control may be accomplished by the use of the blinder tube 38 described in connection with Fig. 5 The flash lamp circuit may also be placed under the control of a timed drum commutator 63 that is schematically shown as rotated in unison with the gear 58 to cut out current flow to its lamp each time the rocker arm reverses the carriage travel (see Fig. 8).

A further refinement is represented in Fig. 9 wiring diagram. Here a centralized main switch 64 may command the twin circuits designated as 65 and 66. The lamp circuit 65 may furnish energizing current to the movable flash bulbs 60A, 60B, etc. under control of a timed commutator such as 63. The motor circuit 66 may however, be independently wired to include a rheostat 67 that is intended to change the speed of one or more drive motors such as 56 and thereby alter the rate of carriage travel in conformity with the prevailing wind velocity.

In order to provide for automatic operation, this rheostat may be operatively connected with the hub of a governor 68 that is rotated by the anemometer 69 (see Fig. 7). By virtue of the described instrumentalities, four pairs of lenses of the Fig. 6 pointer will be simultaneously flashed and such display carried progressively onward in the direction of the vane 55, the rate of flash travel being controlled within predetermined limits, by the speed at which the wind velocity rotates such aerodynamic cups. In lieu thereof, manipulative motor speed controls may be employed to likewise change the rate of flash travel so that an oncoming aviator may be appraised of both the direction and the state of the ground wind prevailing in the vicinity of the air port.

As a further alternative disposition for pointer purposes, Fig. 10 shows a row of my wigwag units 71 arranged in alongside formation as mounted upon a common pivotal plate 70 to comprise a shaft portion of a relatively large sized pointer arrow, while a series of other such units designated as 72 are disposed in tandem alignment to constitute a spear head region of said arrow. The tail vane 73 is again placed radially away from the trunnion 74. The respective lens courses of such multiple units may be flashed without need of any mechanical arm interconnections at a comparatively fast oscillatory rate in order to set up a display effect which adequately defines a simulated pointer profile. If desired, each carriage bulb may be equipped with a double filament or preferably with twin lamps adapted to intensify the flash effect and thereby insure a maintained light display in the event any one of such twin lamps should become defective.

It is believed the foregoing disclosures make apparent to those skilled in this art, the intended function, mode of operation and the resulting advantages afforded by my improved wigwag signal devices over the prior art. It is to be understood that various changes in the illustrative structural details and arrangement may be resorted to in likewise embodying the underlying teachings expounded herein, all without departing from the spirit and scope of my invention heretofore described and more particularly pointed out in the appended claims.

I claim:

1. A wigwag signal comprising a planular wall having a row of lenses disposed therethrough in abreast alignment to constitute a rectilinear lens course, guideway means carried by said wall and extending in substantial parallelism with said lens course, a reciprocative carriage running in said guideway means, a lamp bulb conveyed by said carriage into successive registration with the lenses of such course, and actuated rocker arm means of which the fulcrum is fixedly mounted by said wall and the free end of which arm is operatively connected to said carriage.

2. In a wigwag signal, a head member having a wall that is superficially shaped to comprise a pair of oppositely inclined side wall components, a row of lenses mounted in abreast alignment lengthwise of each such wall component to constitute duplex rectilinear lens courses that are spaced apart in substantial parallelism, guideway means carried by said head wall and extending lengthwise along the respective lens courses, a reciprocative carriage running in said guideway means, a lamp bulb mounted upon said carriage with the light source operatively interposed between the respective lens courses and which carriage conveys said bulb into successive registration with the respective lenses of each such course, and actuating means for reciprocating the carriage, said means including a fulcrumed rocker arm of which the free end is operatively connected with the carriage.

3. In a unitary wigwag signal, a head having a wall that is superficially corrugated to comprise two furrows with a ridge interposed therebetween that includes a sloping side wall component, a row of lenses mounted in abreast alignment lengthwise of and through such wall component to constitute a rectilinear lens course, a pair of opposed guideways respectively disposed contiguous to the furrow regions of said head wall, a reciprocative carriage running in said guideways, a lamp bulb conveyed by said carriage into successive registration with the several lenses of said course, a framework carried by the head, a fulcrum on said framework, an actuated rocker arm mounted to turn about said fulcrum, reduction gear means including a crank pin rotatably mounted upon said framework, a connecting rod interconnecting the crank pin with the rocker arm, and motive means also carried by said framework and which means actuates the rocker arm through said gear means, the aforesaid motive means and carriage together with the lenses being assembled as a self-contained operative unit.

4. In a sunken wigwag signal of the pit type, a pit cover having a wall that is superficially corrugated to comprise two furrows with a ridge interposed therebetween and which ridge includes a pair of oppositely inclined side wall components, a row of cone shaped lenses mounted in abreast alignment lengthwise of each such sidewall component to constitute rectilinear lens courses that are spaced apart in substantial parallelism and have all of the lens crowns directed outwardly from said cover wall, a pair of opposed guideways disposed beneath said wall and respectively adjoined to the furrows thereof, a reciprocative carriage running in said guideways, a lamp bulb conveyed by said carriage into successive registration with the several lenses of each such course, and actuating means for reciprocating the carriage.

5. In a sunken wigwag signal of the air port pit type, a pit cover having a wall whose upper surface is corrugated to comprise three ridges with a furrow interposed between next adjacent ridges, the central ridge including a pair of oppositely inclined sidewall components, a row of lenses mounted in abreast alignment lengthwise of and through each such wall component to constitute rectilinear lens courses that are spaced apart in substantial parallelism, a depending framework attached to an outer ridge, guideway means extending lengthwise beneath the respective lens courses, a reciprocative carriage running in the guideway means, a lamp bulb conveyed by the carriage into successive registration with the several lenses of each such course, and actuating means for reciprocating the carriage, said means being operatively mounted upon the aforesaid framework.

6. A combined signal comprising a series of wigwag units, each such unit being provided with a row of lenses disposed in abreast alignment to constitute a lens course and which courses are respectively placed end to end, a guideway disposed lengthwise of each such lens course, a reciprocative carriage for each guideway, a lamp bulb conveyed by each such carriage into successive registration with the lens course thereof, and actuating means reciprocating said carriages in unison, said means including interconnecting link means operatively interposed between the respective carriages.

7. A direction signal comprising complementary wigwag units, each such unit being provided with a row of lenses disposed in abreast alignment to constitute a lens course and which courses are arranged in V-shaped formation, separate guideway means extending lengthwise of each such lens course, separate reciprocative carriage running in each such guideway means, a lamp bulb conveyed by each such carriage into successive registration with the lens course thereof, actuating means for reciprocating the respective carriages toward and away from the converging region of the aforesaid formation, and common drive means operatively connected to reciprocate said actuating means in a fixed concordant relationship.

8. A display signal comprising a series of wigwag units, each such unit being provided with duplicate parallel rows of lenses having their respective axes disposed in angular relationship to constitute a duplex lens course and the respective courses of which units are arranged in tandem alignment, guideway means for each such unit extending lengthwise along the lens course thereof, a reciprocative carriage running in each such guideway means, a lamp bulb conveyed by each such carriage into successive registration with the lenses comprised in the course corresponding thereto, and means reciprocating the several carriages to effect a combined light display, said means including interconnecting tie means for positively synchronizing the reciprocative movements of all such carriages.

9. A display signal comprising a pair of wigwag units, each such unit being provided with a corrugated cover shaped to provide for oppositely inclined side wall components having a row of lenses mounted lengthwise in each such wall component to constitute duplicate lens courses, complementary guide means supported by said cover and respectively extending lengthwise along said lens courses, a separate reciprocative carriage running in each such guide means, a lamp bulb mounted upon each carriage and which bulbs are conveyed into successive registration with the respective lens courses, tie means operatively linking said carriages together, and motive means driving the linked carriages in unison.

JOHN D. KEITH.